Sept. 12, 1944.     H. B. BARRETT     2,357,803
BRAKE-DRUM LATHE
Filed Nov. 27, 1941     4 Sheets-Sheet 1
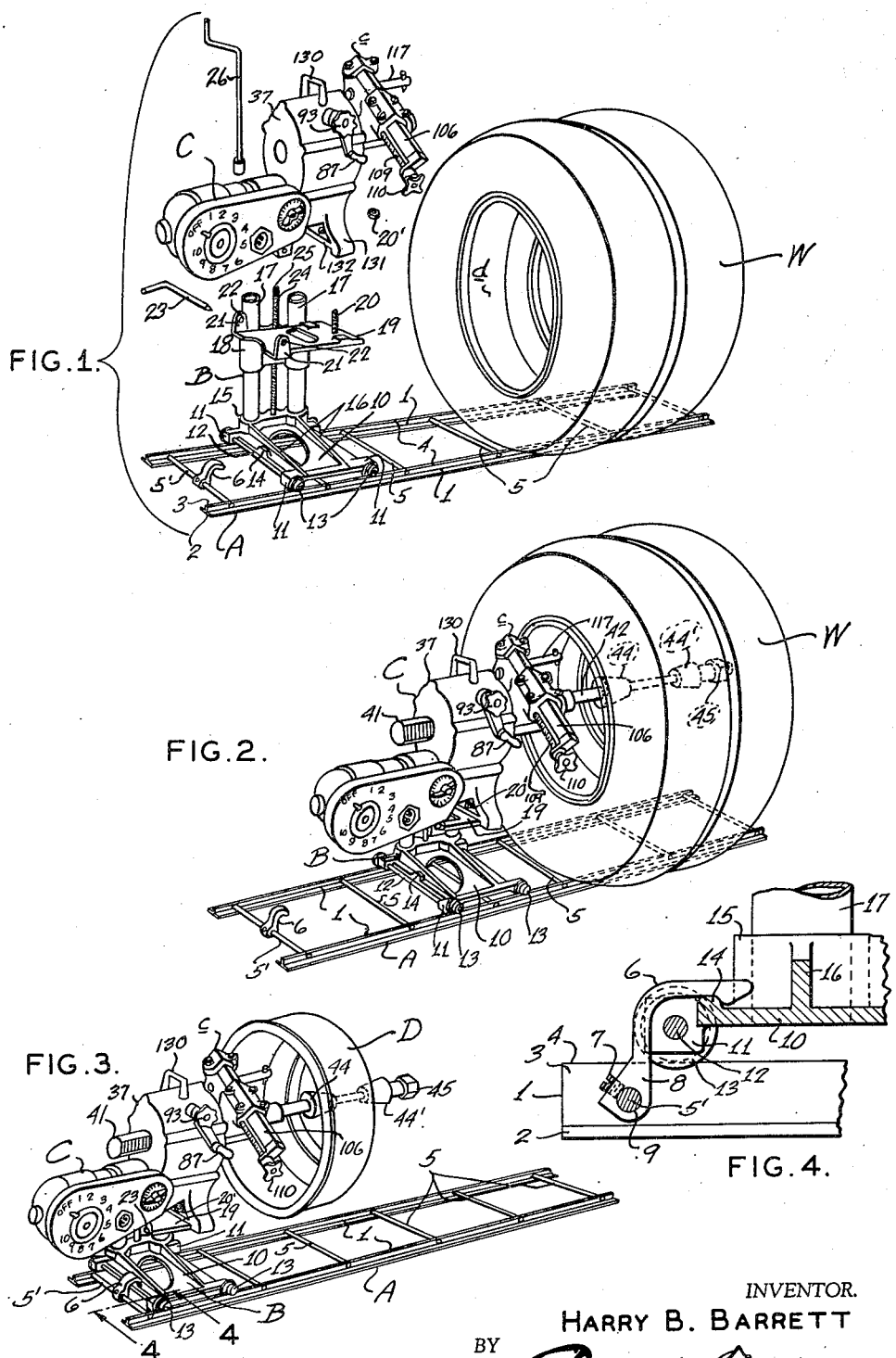
INVENTOR.
HARRY B. BARRETT
BY
ATTORNEY

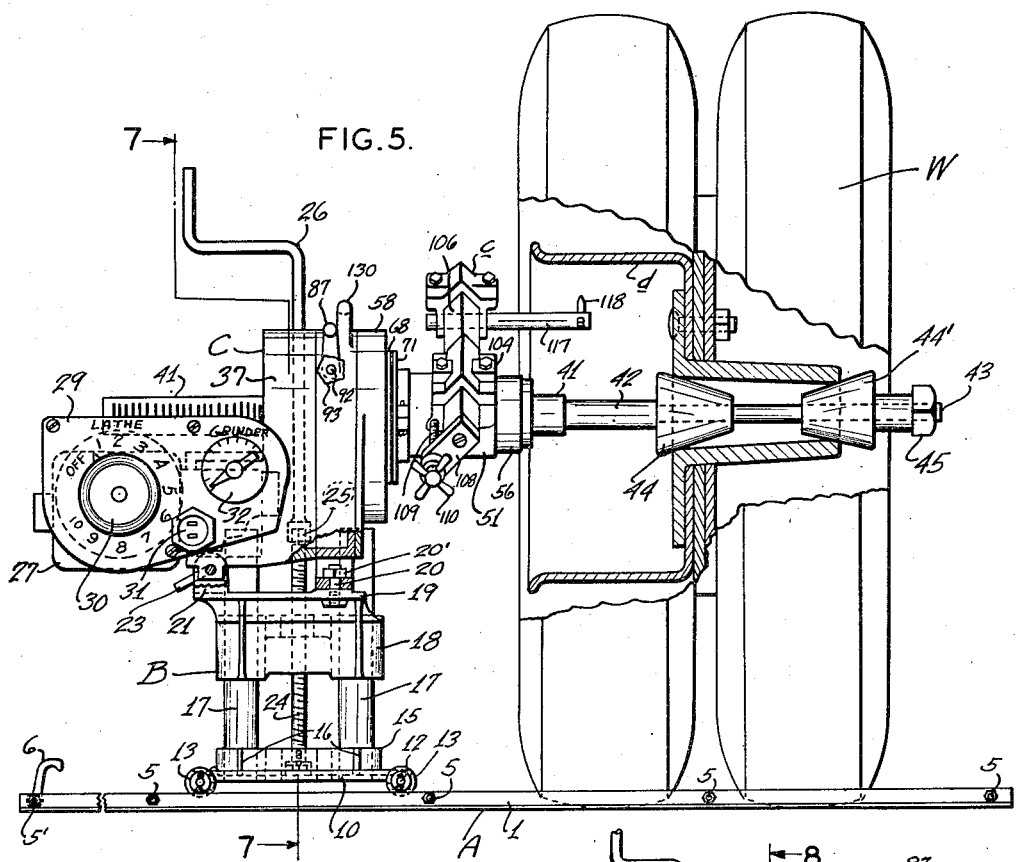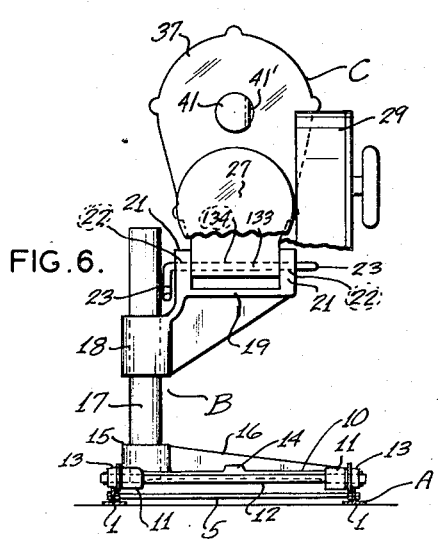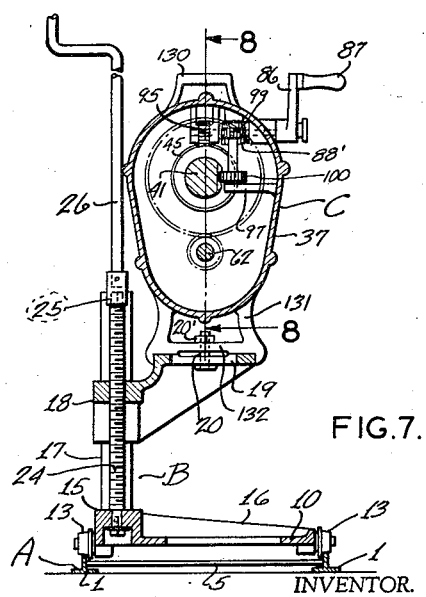

Sept. 12, 1944.  H. B. BARRETT  2,357,803
BRAKE-DRUM LATHE
Filed Nov. 27, 1941  4 Sheets-Sheet 3
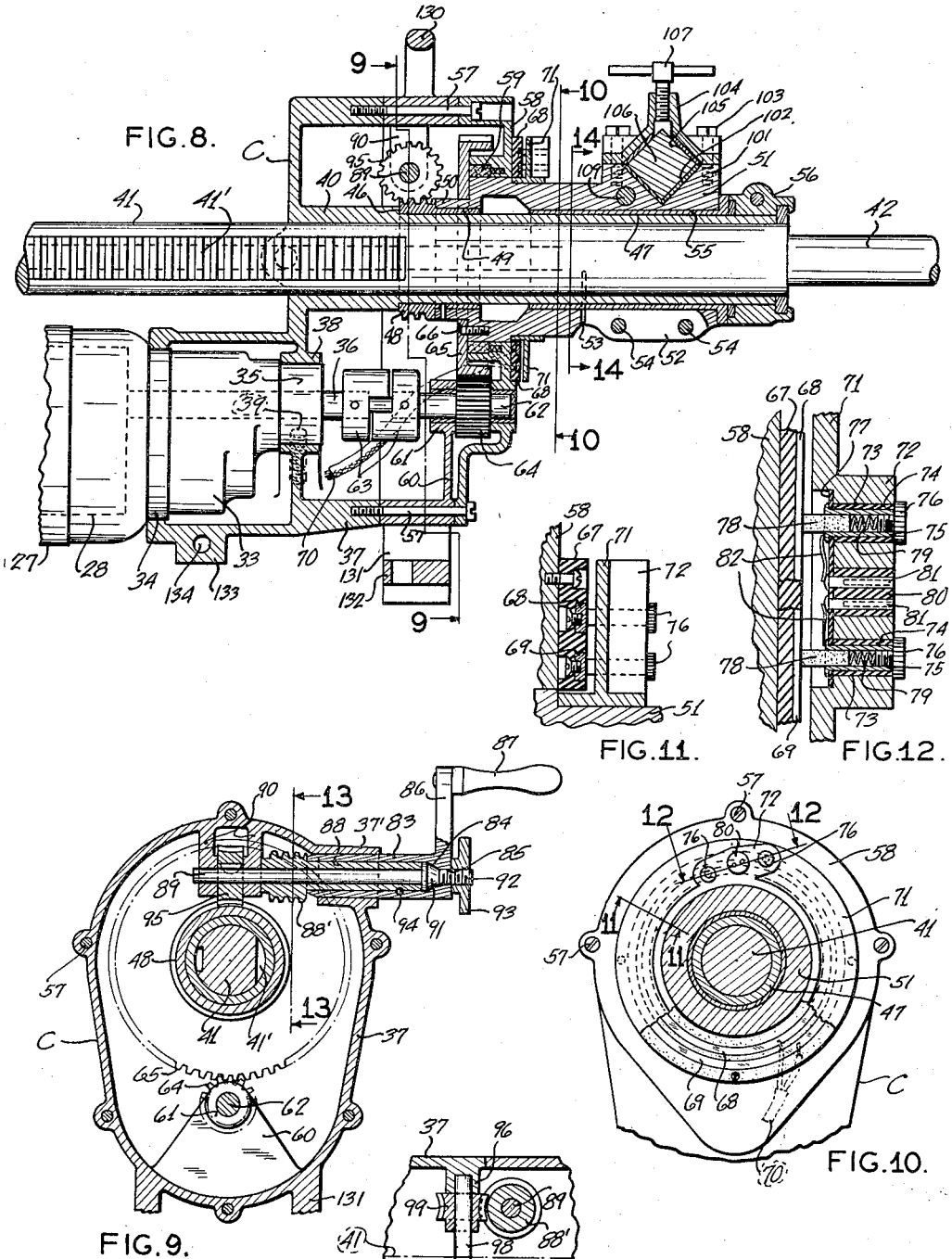
INVENTOR.
HARRY B. BARRETT
BY
ATTORNEY

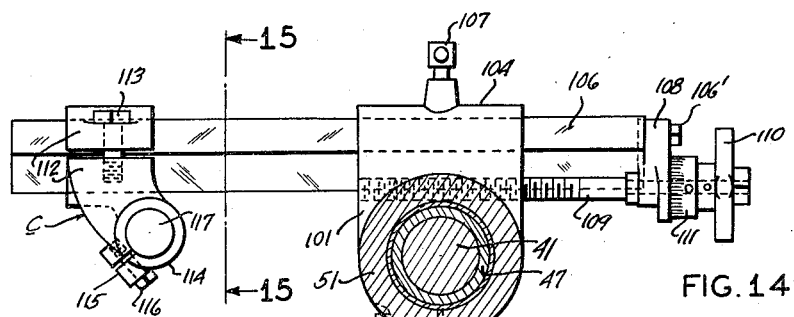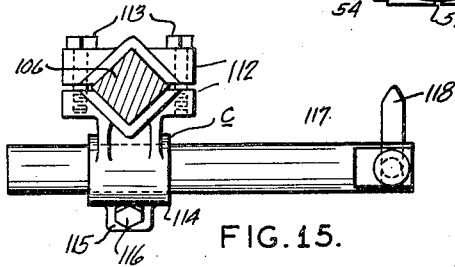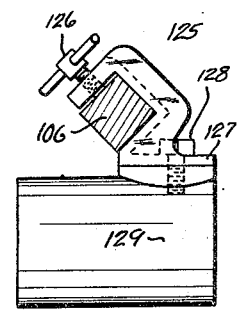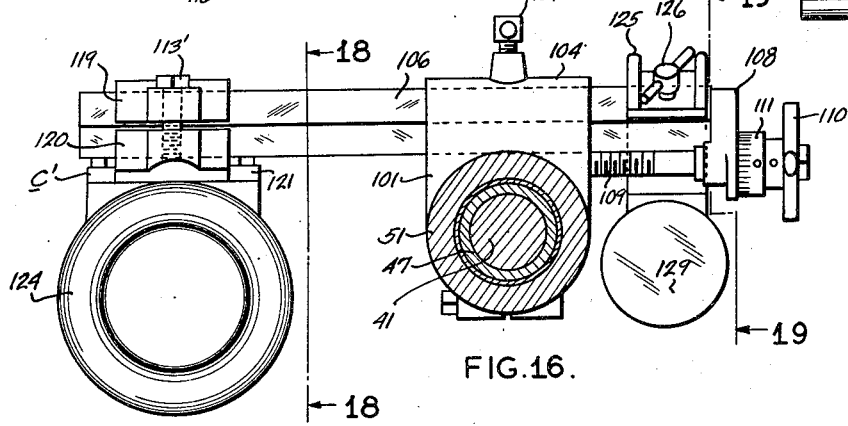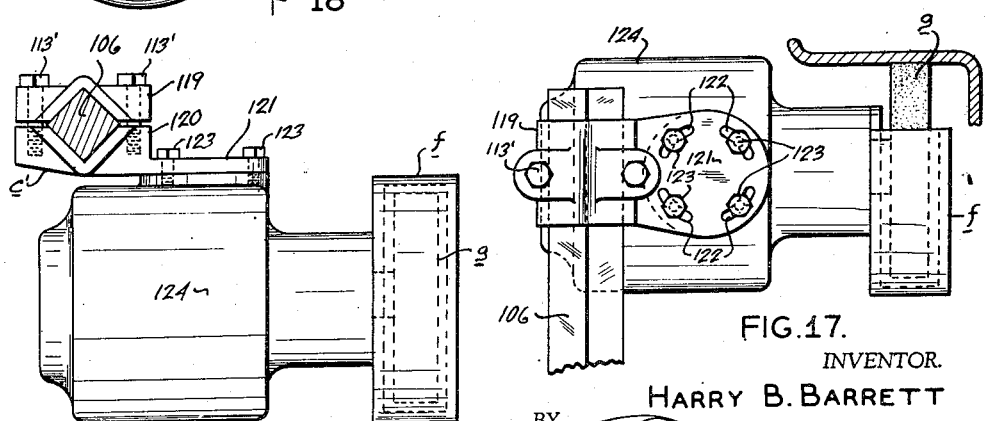

Patented Sept. 12, 1944

2,357,803

UNITED STATES PATENT OFFICE 2,357,803

BRAKE-DRUM LATHE

Harry B. Barrett, St. Louis, Mo., assignor to H. B. Barrett Company, Ltd., St. Louis, Mo., a corporation of Nevada Application November 27, 1941, Serial No. 420,657

18 Claims. (Cl. 77—2)

This invention relates generally to metal turning and truing machines and, more particularly, to certain new and useful improvements in metal truing machines of the type commonly known as lathes especially, though not exclusively, adapted for use in connection with brake-drums and the like.

My invention has for its primary objects the provision of a lathe of the type mentioned which is simple and economical in construction, which is highly precise and accurate in operation, which is readily portable and adjustable so as to be adaptable to a wide variety and range of practical situations and conditions ordinarily met in repair shops and maintenance stations, which may be conveniently employed in the handling of large sized brake-drums, such as those encountered on large transport trucks and other heavy motor vehicles, which is universal in its adaptability to various types of brake-drum truing operations and may be employed for drum-grinding, as well as drum turning, and which is otherwise highly efficient in the performance of its stated functions.

And with the above and other objects in view, my invention resides in the novel features of form, construction, arrangement, and combination of parts presently described and pointed out in the claims.

In the accompanying drawings (four sheets),—

Figure 1 is a so-called exploded perspective view of a lathe constructed in accordance with and embodying my present invention;

Figure 2 is an assembled perspective view of the lathe in connection with a dual-wheel mounted brake-drum;

Figure 3 is a reduced perspective view of the lathe in connection with a dismounted brake-drum;

Figure 4 is an enlarged sectional view of the lathe taken approximately along the line 4—4, Figure 3;

Figure 5 is an enlarged side elevational view, partly broken away and in section, of the lathe in operative relation to a dual-wheel mounted brake-drum;

Figure 6 is a fragmental rear elevational view of the lathe;

Figure 7 is a vertical sectional view of the lathe taken approximately along the line 7—7, Figure 5;

Figure 8 is a sectional view of the lathe taken approximately along the line 8—8, Figure 7;

Figures 9 and 10 are transverse sectional views of the lathe taken approximately along the lines 9—9 and 10—10, respectively, Figure 8;

Figures 11 and 12 are detail sectional views of the lathe taken approximately along the lines 11—11 and 12—12, respectively, Figure 10;

Figure 13 is a detail sectional view of the lathe taken approximately along the line 13—13, Figure 9;

Figure 14 is a transverse sectional view of the lathe taken approximately along the line 14—14, Figure 8;

Figure 15 is a transverse sectional view of the lathe taken approximately along the line 15—15, Figure 14;

Figure 16 is an enlarged detail sectional view illustrating the mounting and counterbalancing of the grinding tool;

Figure 17 is an enlarged plan view of the grinding tool, illustrating the adjustable mounting thereof for engagement with the surface of a brake-drum, a fragmentary portion of the latter being schematically shown in section; and Figures 18 and 19 are transverse sectional views taken approximately along the lines 18—18 and 19—19, respectively, Figure 16.

Referring now in more detail and by reference characters to the drawings, which illustrate a preferred embodiment of my present invention, the lathe is mounted for operation on a suitable preferably smooth floor or support, such, for instance, as a track-assembly A and, broadly speaking, includes a base or support in the form preferably of an elevator-carriage B, which is rollably shiftable on the track-way A, and a self-powered automatic feed lathe head C preferably detachably mounted on and carried by the base or carriage B.

While it is to be understood that the lathe proper is fully operative on any support, the base A furnishes a smooth, even track-way and thereby facilitates lathe actuation. To such end, the base or track A comprises a pair of spaced parallel rails 1 preferably formed of rolled bars having the cross-sectional shape or contour of an inverted T and including a horizontal base web 2 and an upstanding flange 3, the upper horizontally disposed face 4 of which serves as a track-surface, the rails 1 being cross-connected and rigidly held in spaced parallel relation by a plurality of uniformly spaced tie-rods 5 fixed at their ends in, and extending transversely between, the rail flanges 3. Thus a dual-wheel W or the like may be set transversely upon the track A, as shown in Figure 1, the rail flanges 3 functioning somewhat as a cradle and supporting the wheel W with the axis of its hub in upwardly and equidistantly spaced parallel relation to the rails 1.

Rockably mounted preferably on the rearmost tie-rod 5', is a latching hook 6 fixed against lateral translation along the tie-rod 5' by means of a set-screw 7 threaded into the shank 8 of the hook 6 to project into a shallow annular groove 9 suitably turned or rolled into tie-rod 5', all as best seen in Figure 4 and for purposes presently fully appearing.

The support or elevator carriage B comprises a base-casting 10 of approximately rectangular shape and preferably integrally provided at its four corners with horizontally projecting ears 11 arranged in forwardly and rearwardly projecting transversely aligned pairs and coaxially bored for accommodating transverse shafts 12, which extend horizontally therethrough and are provided at their outer ends with small flanged wheels 13 sized and spaced for rollable movement either along the track-face 4 of the rail-flanges 3 or upon any other suitable support, floor, or the like.

Along its rear transverse margin midway between the ears 11, the base casting 10 is provided with an upstanding lug 14 for detent-forming engagement with the hook 6.

On its upper face and along one lateral margin, the frame or casting 10 is formed with an upstanding boss or shoulder 15, which is, in turn, reinforced by two spaced webs 16 extending longitudinally across the upper face, and feathered downwardly toward the opposite lateral margin, of the frame or casting 10, and fixed in, and extending perpendicularly upwardly from, the boss 15, are two spaced cylindrical slide-posts 17.

Shiftably mounted on, and extending between, the slide-posts 17, is a frame or platform 18 preferably integrally including a horizontally disposed bracket-plate or shelf 19 projecting inwardly over the base-casting 10 and provided adjacent its forward margin with an upstanding threaded stud 20 and along its rear margin with upstanding transversely aligned ears 21 having registering apertures 22 for mounting a pull-rod 23.

Mounted rotatably at its lower end in the boss 15 and threaded vertically through the frame 18 preferably midway between the slide-posts 17, is an elevator-screw 24 having a squared upper end, as at 25, for detachably receiving a suitable actuating socket-ended crank 26.

The lathe C proper comprises a suitable shell 27 for housing an electric motor 28, and forming part, and disposed on a side face, of the shell 27, is a box-like auxiliary shell 29 for conventionally mounting and housing a motor controlling rheostat 30, a separable plug receptacle 31, and a grinder control rheostat 32.

At its forward end, the motor-shell 27 is formed with a preferably integral sleeve-like extension 33 having a narrow external land 34 and at its forward end diametrally reduced in the provision of an annular bearing-collar 35 through which the motor-shaft 36 is journaled.

Clamped or otherwise secured upon the shell-extension 33, is a transmission housing 37 formed internally with a tubular bearing 38 for snug-fitting embracing engagement with the bearing-collar 35, the companion bearing-members 35, 38, being preferably suitably secured together as by means of a pair of oblique set-screws 39.

Forming preferably an integral part of the housing or shell 37 and disposed in upwardly spaced parallel relation to, and projecting forwardly beyond, the motor-shaft 36, is a tubular hub-member or the like 40 bored for lengthwise slidably, but non-rotatively, accommodating an arbor 41 equipped longitudinally with a rack-forming series of laterally presented teeth 41'.

At its forward end, the arbor 41 is diametrally reduced in the provision of an intermediate section 42, in turn, diametrally reduced in the provision of a spindle 43 for accommodating a pair of suitably sized oppositely disposed work-holding or engaging cones 44, 44', the one cone 44 being adapted normally for endwise abutment against the end face of the intermediate section 42 and the other cone 44' being shiftably urged toward the cone 44 by means of a nut 45 threaded on the spindle 43, all as best seen in Figure 5.

On its outer face and intermediate its ends, the hub-member 40 is machined down for a substantial portion of its length for providing an annular abutment 46 and a bearing 47, and journaled upon the bearing 47 and abutting at its rear end against the shoulder 46, is a worm 48 provided at its opposite end with a forwardly projecting diametrally reduced annular extension 49 disposed tightly within, and pinned to, a collar-portion 50 of an annular tool-carrying member 51 sleeved coaxially upon the hub-member 40 and projecting forwardly of, and beyond, the shell 37, the member 51 being longitudinally split and lipped at its forward end, as at 52, and having a communicating transverse split, as at 53, in the provision of a clamp for receiving, and by means of clamping bolts 54 retaining, an annular bushing 55 sized for snugly fitting for rotation upon the bearing-face 47 of the hub-member 40, which latter, at its outer end, is provided with a grease-retaining and clamp-collar assembly 56 for securing the tool-carrying member or bar 51 against longitudinal translation along the hub-member 40.

Removably secured, as by means of screws 57 or the like, upon the forwardly presented margin of the transmission shell or housing 37, is an annular cover-plate 58 suitably apertured for snug-fitting rotatable engagement with the outer face of the tool-carrying member 51 and provided with a spring-pressed felt sealing ring 59.

Formed preferably integrally with the transmission housing 37 and disposed at right angles to the axis of the arbor 41, is a web-member 60 provided at its free end with a suitably lined bearing ring 61, and rotatably mounted in and projecting through the ring 61 and journaled at its forward end in the cover plate 58, all as best seen in Figure 8, is a driven-shaft 62 drivingly connected at its rear end by a pair of conventional separable coupling elements 63 to the motor shaft 36.

Fixed upon the driven-shaft 62 intermediate the bearing-ring 61 and the cover-plate 58, is a pinion 64 meshing with a relatively large ring gear 65 mounted on the collar 50 of the tool-carrying member or bar 51 and held in place preferably by suitable machine screws 66.

Fixed upon the forwardly presented face of the cover-plate 58 in concentric relation to the tool-carrying bar 51, is a dielectric ring 67 provided, in turn, in its forward face with a pair of spaced concentric commutation rings 68, 69, respectively connected by a suitable electric conduit 70 to the grinder control rheostat 32.

Fixed upon the outer face of the tool-carrying bar 51 in forwardly spaced relation to the dielectric ring 67, is a brush-carrying ring 71 formed with an enlargement 72 having two relatively large drill holes 73 lined with dielectric tubes 74, and disposed within each of the tubes 74, is a metallic brush-carrying barrel 75 internally threaded at its outer end for receiving a screw type closure element 76 and upset at its inner end for retentive engagement with a transversely extending insulative sheet 77, suitably shaped carbon brushes 78 being shiftably mounted in the tubes 75 and urged outwardly by compression springs 79 into endwise wiping engagement with the commutation rings 68, 69.

Also mounted in and extending through the enlargement 72 midway between the brushes 78, is a dielectric socket 80 having companion conductor-receptacles 81 suitably connected at their inner end by conductors 82 to the brush-holding barrel 75, all as best seen in Figure 12 and for purposes presently fully appearing.

In its upper portion, the shell 37 is formed with a bearing, as at 37', mounted in and extending through which, as best seen in Figure 9, is a tubular shaft 83 having uniform outer and inner diameters throughout its length except adjacent its outer end, where the shaft 83 is internally tapered, as at 84, to provide a bore 85 of reduced diameter. Adjacent such outer end, the shaft 83 is further provided or formed with a radially extending crank-arm 86, equipped at its outer end with a conventional handle 87.

Disposed lengthwise within the shaft 83 and terminating at its outer end just short of the taper 84, is a quill 88 provided at its inner projecting end with a worm 88'. Extending rotatably through the quill 88, is a shaft 89 journaled at its inner end in hanger-bearings 90 depending in the shell 37, the shaft 89 being provided at its outer end with a diametrally enlarged frusto-conical extension 91 sized to fit snugly within the tapered portion 84 of the shaft 83 and having an outwardly projecting threaded shank 92 for receiving a manually operable locking nut 93.

The shaft 83 and quill 88 are permanently secured together, as by a pin 94, while the shaft 89 is releasably connected to the shaft 83 as by means of the friction created or arising between the cone portion 91 thereof and the tapered portion 84 of the shaft 83 when the nut 93 is tightened.

Keyed upon the shaft 89 intermediate the hangers 90, is a worm-gear 95 having meshing engagement with the worm 48 associated with the tool-carrying bar 51, all as best seen in Figure 9.

Journaled at its upper end in a bifurcated boss 96 depending from, and preferably formed integrally on the inner face of, the transmission housing or shell 37 and at its lower end in a bracket-arm 97 extending inwardly from, and likewise preferably formed integrally upon the inner face of, the transmission housing or shell 37, is a jack-shaft 98, keyed upon which is a worm gear 99 meshing with the worm 88', and also keyed on the jack shaft 98 adjacent its lower end, is a pinion 100 meshing with the rack-teeth 41', all as best seen in Figure 13.

At its forward end, the tubular tool-carrying bar 51 is preferably integrally provided with an enlarged pad 101 provided in its upper face with a transversely extending V-shaped recess 102, and detachably secured upon the pad 101, as by means of bolts 103, is a clamp-frame 104 having an opposed V-shaped recess 105 complementary or companion to the recess 102 for slidably or adjustably accommodating a transversely extending tool-holder bar 106 having a corresponding rectangular or square cross-section, a clamp screw 107 being threaded for movement in the clamp-frame 104 for impinging engagement against one longitudinal corner of the tool-holder bar 106 for firmly securing the latter in an adjusted position.

In its one end face, the tool-holder bar 106 is drilled and tapped for receiving a threaded stud-bolt 106' for securing thereon an end-plate 108, and mounted for rotation in, and extending through, the end-plate 108 in suitably spaced parallel relation to the bar 106 and also threadedly mounted in the pad 101, is a feed-screw 109 provided with a hand-wheel 110 at its outer end for manual manipulation. Fixed on the shank of screw 109 intermediate the end-plate 108 and the wheel 140, is a graduated ring 111 for facilitating the determination of the amount of tool-feed.

At or adjacent its other end, the tool-holder bar 106 is provided with a pair of complementarily shaped or companion clamping members 112 detachably secured together by bolts 113, the lower member 112 being provided with a depending lug 114 longitudinally drilled and slotted and formed with ears 115 and equipped with a clamping-bolt 116 for clampwise adjustably accommodating a tool-bar 117, in turn, conventionally provided at its outer end with a lathe-tool or bit 118, all as best seen in Figures 14 and 15.

Also provided for disposition upon the tool-holder bar 106 in place of or substitution for the tool-holder c, is a grinder mounting clamp c', which includes a clamping-plate 119 substantially identical with the plate 112 and equipped with bolts 113' for securement to a complementarily shaped or companion nether plate 120 having a laterally projecting plate-like extension 121, in turn, provided with four equally spaced segmental closed-end slots 122 for receiving supporting screws 123 threaded into the housing of a grinder motor 124 for adjustably supporting the latter upon the plate 121, the motor 124 being conventionally equipped with a rotary grinding wheel g and guard frame f, all as best seen in Figures 17 and 18.

Also provided for detachable clamping engagement with the tool-holder bar 106 at its opposite end is a C-clamp 125 having a screw 126 for clamping or impinging engagement with the bar 106, the clamp 125 being provided with a flange 127, to which, as by means of a bolt 128, a weight 129 is secured for counterbalancing the weight of the motor 124, all as best seen in Figures 16 and 19.

The transmission housing or shell 37 is suitably formed or provided with an upstanding carrying handle 130 and on its under face with a depending U-shaped supporting leg 131 adapted for resting on the bracket-plate or shelf 19, the leg 131 having a horizontally disposed bight 132 suitably apertured for engagement with the stud 20, to which the same is detachably secured as by means of a nut 20'.

The shell 37 is also suitably formed with a depending lug 133, which is disposed in rearwardly spaced parallel relation to the leg member 131 and sized for fitting snugly between the ears 21 of the elevator-carriage bracket 19, the lug 133 being transversely drilled in the provision of an aperture 134 registering with the apertures 22 of the ears 21 for accommodating the pull-rod 23.

In use and operation, a wheel W is placed upon the track-base A, as shown in Figure 1, and the bracket 19 of the elevator carriage B, together with the lathe C carried thereby, elevated or lowered, as the working conditions may require, by rotation of the crank 26 and the elevator-screw 24 until the arbor 41 is as nearly aligned with the axis of the hub of wheel W as may be determined by the eye, and it may be remarked that, after a relatively short period of experience and training, the average mechanic becomes capable of estimating such alignment to a very nice degree of accuracy.

The elevator carriage B and its supported lathe C are then shifted toward the wheel W and the cones 44, 44', slipped in place. By tightening the nut-sleeve 45, the cones 44, 44', are drawn tightly in place, forcibly bringing the arbor 41 into precise axial alignment with the hub of the wheel W, as shown in Figure 5. In this connection, it should be noted that any slight misalignment between the hub of wheel W and the arbor 41 will be corrected as the cones 44, 44', are tightened into place, such tightening causing the entire elevator carriage B to tilt slightly and possibly even tilting the wheel W slightly. Accordingly, when the cones 44, 44', are securely tightened in place, the crank 26 may be manipulated to raise or lower the lathe C as may be required to relieve any relative tilting of the elevator carriage B or wheel W.

A suitable electric cord or the like (not shown) is now plugged into the plug or receptacle 31 and the motor 28 energized by suitable adjustment of the motor-controlling rheostat 30. As the motor 28 rotates, the pinion 64 drives the ring gear 65, thereby rotating the tool-carrying bar 51 and its associated structure and causing the tool 118 to turn or cut the surface of the brake-drum d of the wheel W. As the tool-carrying bar 51 rotates, the worm 48 is rotated and, in turn, rotates the worm gear 95, shaft 89, worm 88', worm gear 99, jack shaft 98, and pinion 100, the rotary movement of the latter, which is in mesh with the rack-teeth 41', causing a relative movement between the arbor 41 and shell or housing 37, that is to say, in the present instance, since the arbor 41 is secured by means of the cones 44, 44', to the stationary wheel W, causing not only the hub-member 40 and its associate parts, but substantially the entire lathe head proper C and base B, to correspondingly move forwardly on and relatively to the arbor 41 and track-way or other support A and thereby feeding the tool 118 across the face of the brake-drum d.

After the first or initial cut has been taken across the surface of the brake-drum d, the motor 28 is turned off and the tool-feed mechanism disengaged by loosening the nut 93. Thereupon, the shaft 83 and quill 88 may be turned independently of the shaft 89 by manipulation of the handle 87 in the reverse direction to its automatically driven rotation for retracting the hub-member 40 or lathe head C proper and base B on the track-way or support A and withdrawing the tool 118. The tool bar 106 may then be shifted slightly with reference to the tool-carrying bar 51 by proper manipulation of the hand-wheel 110 and feed screw 109 to advance the tool 118 into position for taking a second cut, whereupon, nut 93 being tightened, the motor 28 may again be energized and the turning operation repeated.

When the drum d has been turned to the proper diameter and rendered truly concentric, the operation may be finished by replacing the tool holder c with the motor-supporting member c' and grinder motor 124, which is provided with a conventional flexible electric cable (not shown) having a suitable prong-type connector plug which may be plugged into the socket 80. The speed of the grinder motor 124 is adjusted by the grinder control rheostat 32 and the motor 124 energized for rotating the grinder g around the arbor 41 and feeding the same across the surface of the brake-drum d to polish the latter. The depth of grinder cut will, of course, be controlled by suitable manipulation of the hand-wheel 110 and feed-screw 109 and the grinder wheel g will be fed across the face of the brake-drum d in the same manner as previously described for the turning operation.

When the lathe head C is mounted in connection with a fixed or stationary dual-wheel W or other work, as shown in Figures 1 and 2, the arbor 41 is, as stated, stationary, and the lathe head C and base B are shiftable relatively to the arbor 41 and on the track-way or support A. When, however, the lathe is employed for turning and truing a dismounted brake-drum D or other such work, as shown in Figure 3, the elevator carriage B is detachably secured to the base or track A by means of the latch-hook 6 and the drum D is suitably mounted and supported concentrically about, and for movement axially with, the arbor-spindle 43. The truing or turning operations are carried out in identically the same manner as previously described, but the lathe head proper C and base B are now stationary and the arbor 41 is lengthwise movable with its attached drum or other work D for shifting the same with respect to the rotating tool 118 for effecting cutting actuations thereby on the drum or work D, as will be clearly apparent.

The lathe fulfills in every respect the objects stated, and it should be understood that changes and modifications in the form, construction, arrangement, and combination of the several parts of the lathe may be made and substituted for those herein shown and described without departing from the nature and principle of my invention.

Having thus described my invention, what I claim and desire to secure by Letters Patent is—

1. A lathe comprising, in combination with a track-way, a carriage disposed normally for movement on the track-way, a head mounted on and movable with the carriage, an arbor mounted for movement longitudinally on the head, a cutting-tool mounted for rotary movement on the arbor, means for shifting the arbor and rotarily shifting the tool in a work-surfacing operation, and means for detachably securing the carriage in a selected location on the track-way for such operation.

2. A lathe comprising, in combination with a track-way extended to receive and support the work in fixed position for surfacing operations, a carriage and a head including an arbor and work-surfacing means rotatable about the arbor, the head being adjustable on the carriage for alignment of the arbor with the work and the carriage and head being shiftable on the track-way during rotary actuations of the surfacing means in engagement with the work.

3. In a work-surfacing lathe, a head comprising a housing, an arbor adapted for positioning the work, a tubular bar engaged with the housing and rotatable about the arbor, driving means in the housing connected with the bar for rotarily actuating the latter, commutation rings mounted on the housing concentrically with the bar, brushes carried by the bar for contactive engagement with said rings, an electric motor driven surfacing tool on the bar, and means for connecting the motor and brushes during rotation of the bar.

4. In a lathe, in combination, non-rotary base-means adapted for movable disposition longitudinally upon a support and a head mounted on the base-means, the head including an arbor for attachment to a fixed work, work-surfacing means rotatable about the arbor, and co-operable means between the base and arbor actuable on rotation of the work-surfacing means for moving the base for shifting the rotating surfacing-means axially relatively to the work during a surfacing operation.

5. In a lathe, in combination with non-rotary base-means adapted for movable disposition longitudinally upon a support, of a head including an arbor for attachment to a fixed work, a shell having connection with the base-means and sleeved on the arbor, work-surfacing means rotatable about the arbor and having connection with the shell, and co-operable means between the arbor and shell actuable on rotation of the work-surfacing means for moving the shell and base-means for shifting the connected rotating surfacing-means axially relatively to the work during a surfacing operation.

6. In a lathe, in combination with non-rotary base-means adapted for movable disposition longitudinally upon a support, of a head including an arbor for attachment to a fixed work, a shell attached to the base and sleeved on the arbor, work-surfacing means disposed for rotation about the arbor and having connection with the shell, means for rotarily actuating the work-surfacing means, and rack-and-gear means between the arbor and shell actuable on rotation of the work-surfacing means for moving the shell and base for shifting the rotating surfacing-means axially relatively to the work during a surfacing operation.

7. In a lathe, in combination, a base, an axially shiftable arbor for attachment to a shiftable work, a shell attached to the base and sleeved upon the arbor, work-surfacing means rotatable about the arbor in a selected plane of rotation and having connection with the shell, and co-operable means between the arbor and shell actuable on rotation of the work-surfacing means for shifting the arbor and attached work axially relatively to the rotating surfacing-means and its selected plane of rotation.

8. In a lathe, in combination, base-means adapted for stationary disposition upon a support, and a head mounted on the base-means, the head including an axially shiftable arbor for attachment to a shiftable work, work-surfacing means rotatable about the arbor in a selected plane of rotation, and co-operable means between the base and arbor actuable on rotation of the work-surfacing means for shifting the arbor and attached work axially relatively to the base-means and the plane of rotation of the rotating surfacing-means.

9. In a lathe, in combination with base-means adapted for stationary disposition upon a support, of a head including an axially shiftable arbor for attachment to a shiftable work, a shell attached to the base and sleeved upon the arbor, work-surfacing means rotatable about the arbor in a selected plane of rotation and having connection with the shell, and co-operable means between the arbor and shell actuable on rotation of the work-surfacing means for shifting the arbor and attached work axially relatively to the base-means and the plane of rotation of the rotating surfacing-means.

10. In a lathe, in combination with base-means adapted for stationary disposition upon a support, of a head including an axially shiftable arbor for attachment to a shiftable work, a shell attached to the base and sleeved upon the arbor, work-surfacing means rotatable about the arbor in a selected plane of rotation and having connection with the shell, means for rotarily actuating the work-surfacing means, and rack-and-gear means between the arbor and shell actuable on rotation of the work-surfacing means for shifting the arbor and attached work axially relatively to the base-means and the plane of rotation of the rotating surfacing-means.

11. A lathe comprising, in combination, base-means for disposition upon a support, a head mounted upon the base-means, the head comprising a motor and its shell, a transmission-housing mounted on said shell and embracing a projecting end of the motor-shaft, an apertured hub-member on the housing, an arbor sleeved within the hub-member, a tool-carrying member sleeved for actuation on the hub-member, and actuating means connecting the tool-carrying member with the motor-shaft.

12. A lathe comprising, in combination, base-means for disposition upon a support, a head mounted upon the base-means, the head comprising a motor and its shell, a transmission-housing mounted on the shell and embracing a projecting end of the motor-shaft, an apertured hub-member on the housing, an arbor sleeved within the hub-member, a tool-carrying member sleeved on the hub-member for rotary movement, actuating means connecting the tool-carrying member with the motor-shaft, and means associated with the hub-member and tool-carrying member for effecting relative longitudinal movement between the hub-member and arbor during rotary actuation of the tool-carrying member.

13. A lathe comprising, in combination, base-means for disposition upon a support, a head mounted upon the base-means, the head comprising a motor and its shell, a transmission-housing mounted on the shell and embracing a projecting end of the motor-shaft, a hub-member on the housing, an arbor sleeved within the hub-member, the arbor having a longitudinal rack, a tool-carrying member sleeved on the hub-member for rotary movement, actuating means connecting the tool-carrying member with the motor-shaft, and gearing connecting the rack of the arbor and the tool-carrying member for effecting relative longitudinal movement between the hub-member and the arbor during rotary actuation of the tool-carrying member.

14. A lathe comprising, in combination, base-means for disposition upon a support, a head mounted upon the base-means, the head comprising a motor and its shell, a transmission-housing mounted on the shell and embracing a projecting end of the motor-shaft, a hub-member on the housing, an arbor sleeved within the hub-member for axial disposition with respect to the work, a tubular bar sleeved on the hub-member for rotary movement about the arbor, actuating means connecting the bar with the motor-shaft, and a tool-carrying member mounted on the bar for interchangeably mounting surfacing tools for respective engagement with the work.

15. A lathe comprising, in combination, base-means for disposition upon a support, a head mounted upon the base-means, the head comprising a motor and its shell, a transmission-housing mounted on the shell and embracing a projecting end of the motor-shaft, a hub-member on the housing, an arbor sleeved within the hub-member for axial disposition with respect to the work, a tubular bar sleeved on the hub-member for rotary movement about the arbor, actuating means connecting the bar with the motor-shaft, a tool-holder mounted transversely on the bar, a surfacing tool mounted on the holder, and means on the holder engaged with the bar for adjustably shifting the holder in relation to the bar for increasing or decreasing the depth of cut of the tool.

16. A lathe comprising, in combination, base-means for disposition upon a support, a head mounted upon the base-means, the head comprising a motor and its shell, a tranmission-housing mounted on the shell and embracing a projecting end of the motor-shaft, a hub-member on the housing, an arbor sleeved within the hub-member for axial disposition with respect to the work, a tubular bar sleeved on the hub-member for rotary movement about the arbor, actuating means connecting the bar with the motor-shaft, manually operable means for shifting the hub-member and bar in relation to the arbor, and means for connecting the manually operable means with the bar for driving actuation thereby.

17. A lathe comprising, in combination, base-means, a head mounted upon the base-means, the head comprising a motor and its shell, a transmission-housing mounted on the shell and embracing a projecting end of the motor-shaft, a hub-member on the housing, an arbor sleeved within the hub-member for axial disposition with respect to the work, a tool-carrying member sleeved on the hub-member for rotary movement, and actuating means connecting the tool-carrying member with the motor-shaft, the base-means being adapted for disposition upon a support and the head having connection for adjustment with the base-means for aligning the arbor with the axis of the work.

18. A lathe comprising, in combination, base-means for disposition upon a support, a platform, a head mounted upon the platform, the head comprising a motor and its shell, a transmission-housing mounted on the shell and embracing a projecting end of the motor-shaft, a hub-member on the housing, an arbor sleeved within the hub-member for axial disposition with respect to the work, a tool-carrying member sleeved on the hub-member for rotary movement, and actuating means connecting the tool-carrying member with the motor-shaft, the platform having adjustable connection with the base-means for vertically shifting the head for aligning the arbor with the axis of the work.

HARRY B. BARRETT.